INVENTOR.
Zoroaster G. Parsons
BY
Fred C. Matheny
ATTORNEY

March 31, 1953  Z. G. PARSONS  2,633,110
INTERNAL-COMBUSTION ENGINE
Filed June 9, 1947  3 Sheets-Sheet 3

INVENTOR.
Zoroaster G. Parsons
BY Fred C. Matheny
ATTORNEY

Patented Mar. 31, 1953

2,633,110

UNITED STATES PATENT OFFICE 2,633,110

INTERNAL-COMBUSTION ENGINE

Zoroaster G. Parsons, Seattle, Wash.

Application June 9, 1947, Serial No. 753,403

6 Claims. (Cl. 123—21)

My invention relates to an internal combustion engine.

An object of my invention is to provide an internal combustion engine which embodies the two-stroke cycle principle and the four-stroke cycle principle in one and the same engine and in which means are provided for quickly and easily converting or transposing the engine from one phase cycle to another while the engine is in operation.

Another object of my invention is to combine the two and the four cycle principles of operation in one and the same engine, which has a rated capacity based on the four cycle phase. This provides an engine which will operate smoothly and economically in its four cycle phase and which has an auxiliary reservoir of power that may be drawn on at will by instantly converting the engine to two cycle operation.

Another object of this invention is to provide a combined two and four cycle engine having pressure rectifying compressor means adapted to deliver fuel gas to the power cylinders at a predetermined constant pressure irrespective of the pressure of the atmosphere surrounding the motor, said pressure rectifying compressor means being automatically controlled by the pressure of the fuel gas that is being delivered to the motor.

Another object of this invention is to provide an engine having improved cooling means in the nature of reciprocating cylinders provided with external cooling fins in combination with pistons having passageways therein for the circulation of cooling fluid, said pistons being adapted to have expanding air circulated through said cooling spaces by suction whereby the refrigerating effect of expanding air is utilized to provide uniform cooling and a constant operating temperature thereby preventing unequal expansion of parts and insuring maximum operating efficiency.

Another object of this invention is to provide an engine having a pressure regulating pump placed vertically above a crank shaft and connected therewith and having a universally jointed crosshead to minimize the side thrust or torque that is liable to be developed in the operation of devices of this type.

Another object of this invention is to provide an engine having relatively reciprocable cylindrical parts provided with resilient sealing means in the nature of oil sealing rings, cylinder rings, packing gland rings and the like which are of a constricting or contracting type as contrasted with ordinary piston rings which are of an expanding type.

Another object is to provide improved lubricating means including oil sipping suction conduits and passageways positioned and arranged so as to pick up and return to a reservoir, such as a crank case, any surplus of oil that is supplied to the working parts of an engine, said lubricating means being particularly well adapted for use in connection with oil sealing rings such as piston rings.

Other objects of the invention will be apparent from the following description taken in connection with the accompanying drawings.

In the drawings.

Like reference numerals designate like parts throughout the several views.

Figure 1:
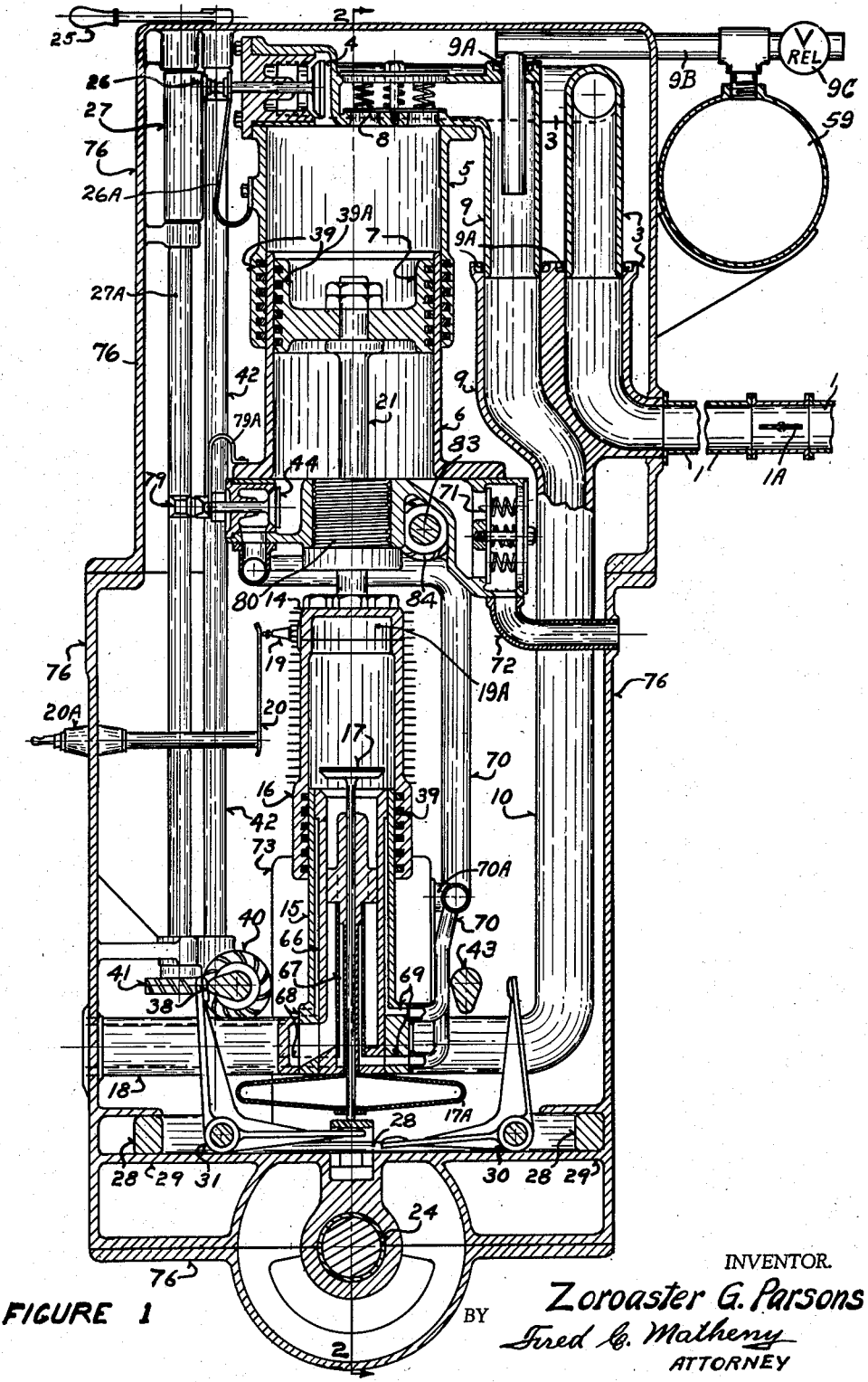
Figure 1 is a vertical sectional view of my internal combustion engine taken substantially on broken line 1—1 of Fig. 2, parts being shown in elevation.

The drawings show an engine disposed within a frame structure 76. The frame 76 is of sufficiently open construction to permit a free circulation of air therethrough. The engine has a fuel inlet conduit 1 connected with a pressure rectifier intake conduit 3 that is formed of two relatively telescopic parts, having a slip joint packing gland therebetween. 4 is a pressure rectifier intake valve. 5 and 6 are two relatively movable cylinders of a telescoping cylinder pressure rectifier. 7 is a pump piston operable within the cylinder 6. 8 is a spring loaded rectifier discharge check valve. 9 is a fuel conduit formed of two relatively telescopic sections having a slip joint packing gland 9A therebetween. The conduit 9 communicates with a conduit 10 that leads to a fixed piston 11 of a power cylinder 13. The conduit 9 is also connected by conduit means 9B with a storage tank 59 for compressed fuel. The connection between conduit 9B and 9 is slidable and is by way of a slip joint packing gland 9A. A pressure operated relief valve 9C is provided in connection with the conduit 9B and storage tank 59.

Fuel that is supplied through conduit 10 to fixed piston 11 is supplied to two reciprocable engine cylinders 13 and 16. The cylinder 13 is an intake power cylinder and the cylinder 16 is an exhaust power cylinder. The fuel for both cylinders 16 and 13 enters through cylinder 13 and the burned gases from both cylinders exhaust from cylinder 16. The fixed piston 11 is operable in the reciprocable intake power cylinder 13. 12 is a valve operable in piston 11 controlling the intake of fuel to the combustion chamber of both of said cylinders 13 and 16. 14 is a cylinder head common to the two cylinders 13 and 16. 15 is a fixed piston operable in the reciprocable exhaust power cylinder 16. 17 is an exhaust valve carried by the piston 15 controlling the exhaust of burned gases from both of the cylinders 13 and 16.

18 is an exhaust conduit, Fig. 1, leading from the lower portion of the fixed piston 15, to a location outside of the housing 76. 19 is a spark plug preferably positioned in a passageway 19A that is provided in the cylinder head 14 between the two cylinders 13 and 16. 20 is a contactor, Fig. 1, supported by a terminal post 20A and positioned so that the spark plug 19 makes sliding contact therewith as the cylinders 13 and 16 and cylinder head 14 move up and down.

Figure 3:
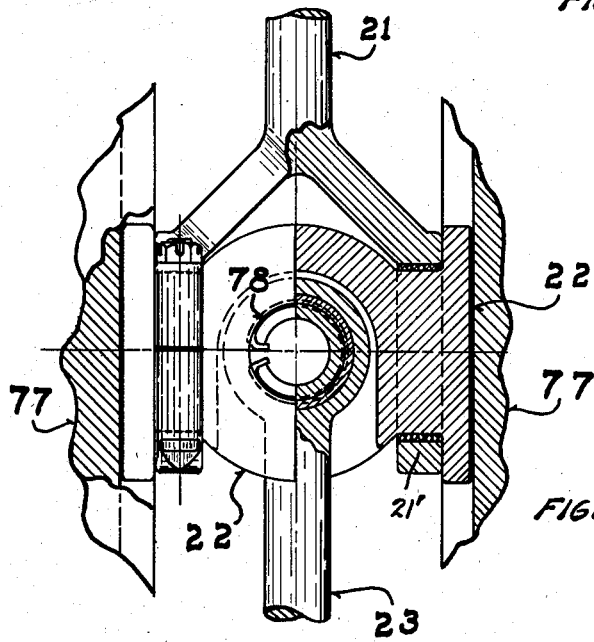
Fig. 3 is a detached fragmentary view partly in section and partly in elevation and on a larger scale than Figs. 1 and 2 showing a crosshead embodied in this engine.

21 is a piston rod that is secured to the pump piston 7 in the cylinder member 6 and is also secured to the cylinder head 14 and extends through a bushing 80 and downwardly between the cylinders 13 and 16. The lower end portion of the piston rod 21 is preferably forked, as shown in Fig. 3, and is connected by pivot means 21' with a crosshead member 22 that is slidable in fixed guide members 77, Fig. 3. 23 is a connecting rod that is connected by wrist pin means 78, Fig. 3, with the crosshead 22. The axis of pivot means 21' is positioned at right angles to the axis of the wrist pin 78 to provide a universal joint type of crosshead. The lower end portion of the connecting rod 23 is connected in the usual manner with a crank shaft 24. Oil passageways 74 and 75 are provided in the bearings that support the crank shaft 24 to supply oil to said crank shaft.

Suitable packing rings 39 in a bushing member 80 are provided in the lower end portion of the cylinder 6 around the piston rod 21. An oil supply conduit 74 and an oil sipping or draw-off conduit 75 are connected with the bushing 80, as more fully hereinafter explained. Preferably the bushing 80 is made of two longitudinally separable parts to facilitate installation of the rings 39.

The intake valve 4 which controls the intake of fuel to the pressure rectifying cylinder 5 is opened by a tappet member 26. 27 is a cam that operates the tappet 26. An upright shaft 27A carries the cam 27. A spring 26A yieldingly urges the valve 4 into a closed position. The tappet 26 is moved to open the intake valve 4 on each down stroke of the piston 7. The fuel conduit 3 communicates with the housing of the valve 4 as shown partly by dotted lines in Fig. 1. The cam 27 is of substantial length to maintain engagement with the tappet 26 irrespective of vertical adjustment of the cylinder 5 and parts connected therewith.

Figure 4:
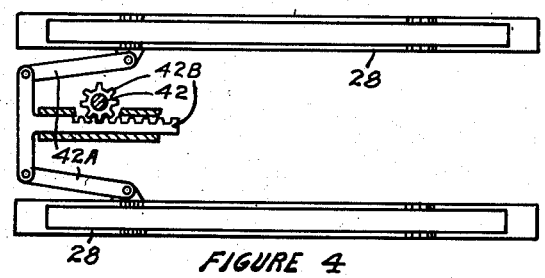
Fig. 4 is a detached plan view with parts in cross section, of two valve tappet carriage members and operating means for the same.

28 are two valve tappet carriage members that are mounted for transverse sliding movement in guide means 29 in the base portion of the housing 76 and are connected as by links 42A and rack and pinion means 42B, see Fig. 4, with the upright phase shifting shaft 42 so that rotary movement of the shaft 42 will move said tappet carriage either into the two cycle position in which it is shown in Fig. 1 or into a four cycle position to the left of the position in which it is shown in Fig. 1. Two bell crank shaped tappet members 30 and 31 are carried by each tappet carriage member 28. The tappet members 30 are four cycle tappets. The tappet members 31 are two cycle tappets. The tappets 30 and 31 are adapted to move the valves 12 and 17 into an open position. Springs 12A and 17A yieldingly urge the respective valves 12 and 17 into closed positions. These springs 12A and 17A are flat elliptically shaped springs.

Figure 2:
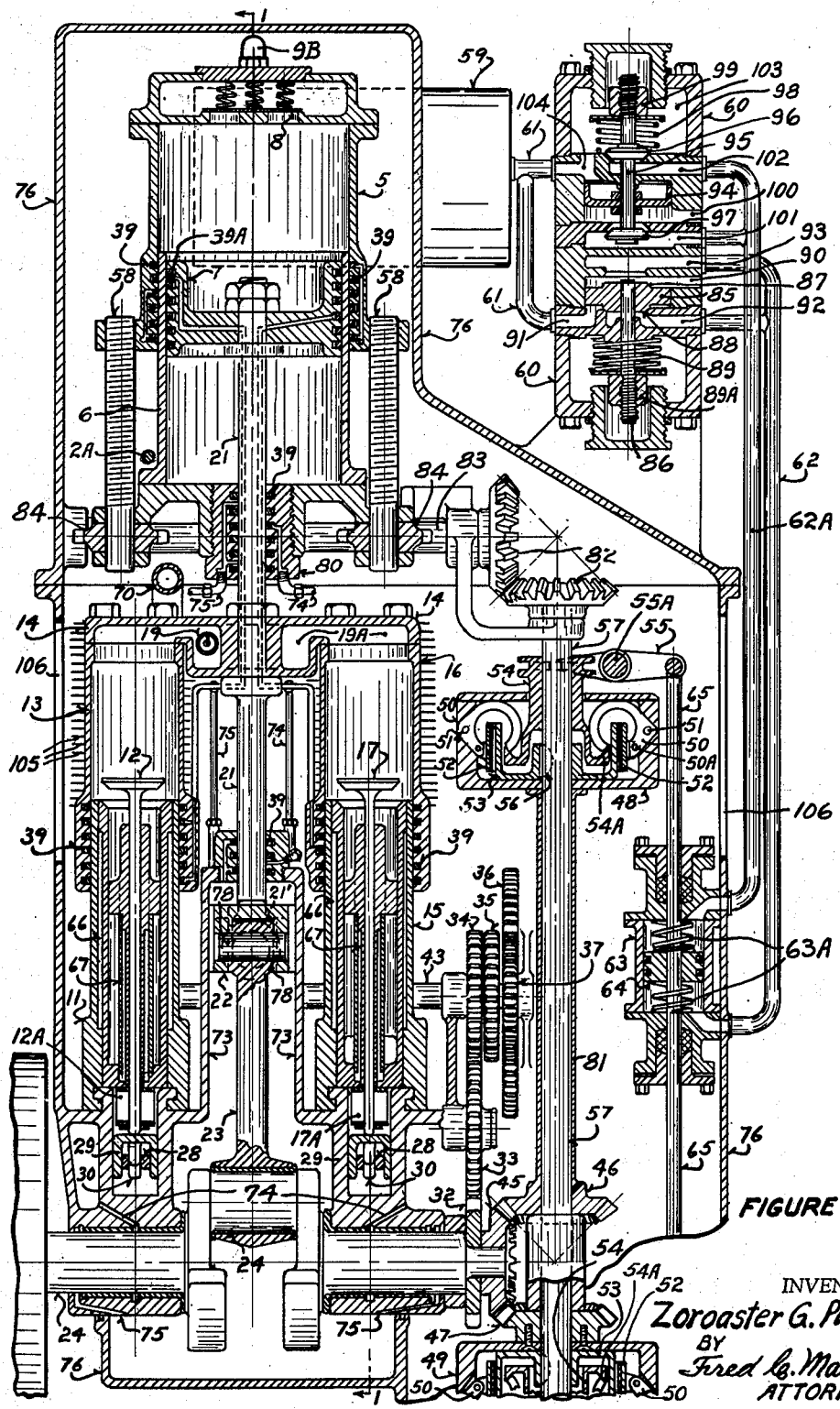
Fig. 2 is a view in vertical section of said engine taken substantially on broken line 2—2 of Fig. 1, parts being shown in elevation.

In Figs. 1 and 2 the cylinder 5 is shown at or near the uppermost limit of its movement and the valve mechanism is shown in a two cycle position. This occurs just after the motor has been shifted from four cycle to two cycle operation.

Figure 5:
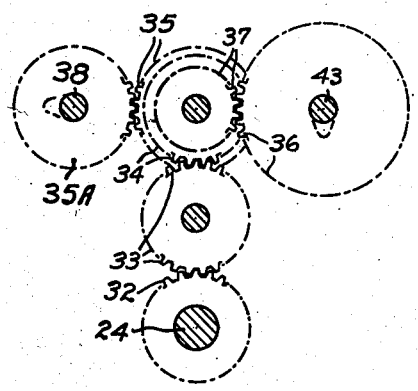
Fig. 5 is a detached somewhat diagrammatic view of cam shaft driving means that can be used in connection with this invention.

Two cam shafts 38 and 43 are provided for operating the tappets 31 and 30 respectively. These cam shafts are driven from the crank shaft 24, Figs. 2 and 5, by a train of gears 32, 33, 34, 35, 35A, 36 and 37. The gears 32, 33, 34, 35 and 35A drive the cam shaft 38 at the same speed as the crank shaft 24 for two cycle operation. The speed reduction afforded by gears 37 and 36 provides means for driving the four cycle cam shaft 43 at one half the speed at which the two cycle cam shaft 38 is driven. The upright cam shaft 27A is driven from the two cycle cam shaft 38 by enmeshed gears 40 and 41.

The motor shown in the drawings is provided with air cooling means but it will be understood that a motor of this type can be liquid cooled or can be partly air cooled and partly liquid cooled.

One part of the air cooling means consists in the provision on the moving cylinders 13 and 16 and head 14 of thin fins 105 that are capable of giving off heat rapidly to air by which they are contacted. Preferably the frame or housing 76 in which these parts 13, 16 and 14 operate is of relatively open construction to afford a free circulation of air. Obviously a forced circulation of air through this frame 76 can be maintained if desired.

The pumping action of the piston 7 is preferably utilized for air cooling the fixed pistons 11 and 15 and parts disposed in these pistons. To facilitate this air cooling of the pistons 11 and 15 these pistons are constructed so that air passageways 66 are provided in the circumferential portion of said pistons and other air passageways 67 are provided around the stems of the valves 12 and 17 within these pistons. Air enters these passageways 66 and 67 through ports 68 and is drawn out through ports 69 into air conduits 70. From conduits 70 this air is drawn past a check valve 44 into the pump cylinder 6 and is expelled past check valve 71 and through conduit 72 to the atmosphere. The conduit 70 is further connected by conduit 70A with the interior of the housing member 73 in which the crosshead 22 operates. This draws air out of housing 73 and the partial vacuum thus produced creates a sipping effect to draw off excess lubrication of the parts connected therewith and is conducive to better lubrication of the parts within said housing 73. Preferably a tappet 79 is provided on the shaft 27A for opening the valve 44 and a spring 79A is provided for yieldingly urging said valve 44 into a closed position. Obviously the tappet 79 can be omitted and the valve 44 allowed to operate as an ordinary check valve.

In the event the pistons 11 and 16 are to be cooled by water then water cooling and circulating means is connected with the ports 68 and 69, Fig. 1, to maintain a continuous circulation of cooling water through the cooling spaces 66 and 67. If this is to be done the portion of conduits 70 below the connection 70A is omitted.

Another novel feature embodied in this engine resides in the means for lubricating the various groups of cylinder and pressure sealing rings, such as expanding rings 39A carried by piston 7 and contracting rings 39 carried by cylinder 5, bushings 80 and cylinders 13 and 16. This lubricating means functions to supply adequate lubrication and to prevent excess oil from working into spaces where it is not needed. To facilitate installation of contracting rings in cylinders of larger diameter, such as cylinders 5, 13 and 16, the grooves for receiving said rings can be made of larger diameter than the rings.

In connection with each group of these rings oil under pressure is introduced by conduit means 74 back of one of the medial rings of the group and the oil in excess of that needed for lubricating the rings and parts engaged thereby is withdrawn by suction through oil sipping conduits that communicate with the end rings or with rings near the end of each group. This oil is usually returned to the crank case. The partial vacuum in the crank case is sufficient to provide suction for this oil sipping operation.

Pressure controlled devices are provided for automatically adjusting the cylinder 5 so as to maintain the fuel vapor that is to be supplied to the power cylinders at any desired pressure irrespective of the atmospheric pressure in which the engine is operating. Usually these devices are set so they will maintain the fuel vapor approximately at sea level pressure or a little above that pressure irrespective of the altitude at which the engine is operating.

The pressure controlled devices for thus adjusting the cylinder 5 are driven from the crank shaft 24. These devices include a shaft 57 having two clutch drums 53 secured thereto as by key means 56. One clutch drum 53 is disposed in an upper clutch case 48 and the other clutch drum 53 is disposed in a lower clutch case 49. Two gearwheels 46 and 47 are rotatively mounted on the shaft 57 and mesh with a gearwheel 45 on the crank shaft 24. The upper gearwheel 46 is rigid with a sleeve 81 on the shaft 57. The sleeve 81 is secured to the upper clutch case 48 so that the clutch case 48 rotates with the sleeve 81. The lower gearwheel 47 is secured to the lower clutch case 49 so that the lower clutch case 49 is rotated with said lower gearwheel 47 and in the opposite direction from the upper clutch case 48 when the motor is operating. The mechanism within each clutch case 48 and 49 is similar and only fragments of the mechanism in the lower clutch case 49 is shown. The portion of the shaft 57 within each clutch case 48 and 49 has the cylindrical clutch drum 53 secured thereto. A plurality of shoes 52 are provided externally of each drum 53. Each shoe 52 has a suitable lining applicable to its drum and each shoe 52 is supported on a curved bracket 50 with which it is connected by a pivot 50A. Each bracket 50 is connected by a pivot 51 with the housing 48 or 49 by which the bracket is carried. The brackets 50 are adapted to be angularly moved on the pivots 51 to apply the shoes 52 to the drums 53 by sleeves 54 that are longitudinally movable on the shaft 57. Each sleeve 54 has an inclined dish shaped flange 54A on its inner end that engages with the inner end portions of the brackets 50 so that movement of the sleeve 54 in one direction will apply the shoes 52 to their drum 53 and movement of the sleeve 54 in an opposite direction will release said shoes as respects said drum.

The uppermost sleeve 54 shown in Fig. 2 is adapted to be longitudinally moved by a shifter lever 55. The lever 55 is fulcrumed on a pivot 55A and connected with a reciprocable rod 65 by which it can be moved.

The lowermost sleeve 54, Fig. 2, is connected in a similar manner with the same rod 65. This provides means which will operate as follows: When the rod 65 is in a medial or neutral position, as shown in Fig. 2, the shoes 52 in both of the housings 48 and 49 will be released from the drums 53. When the rod 65 is moved downwardly, Fig. 2, the shoes 52 will be applied to the drum 53 in the upper housing 48. When the rod 65 is moved upwardly, Fig. 2, the shoes 52 will be applied to the drum 53 in the lower housing 49.

This provides means controlled by the shifter rod 65 for rotating the shaft 57 in either direction, depending on the direction of movement of the shifter rod 65. The shaft 57 is connected by bevel gears 82, shaft 83, and worm gear means 84 with adjusting screws 58 that are threaded into fixed parts of the telescopic cylinder 5. Thus rotation of shaft 57 in one direction will move the cylinder 5 upwardly and increase the volume of the fuel chamber above the piston 7. In a similar manner rotation of the shaft 57 in an opposite direction will move the cylinder 5 downwardly and reduce the volume of said fuel chamber above the piston 7. Obviously the pressure to which the piston 7 will compress the fuel vapor that is expelled past the check valve 8 will tend to vary inversely as the size of the chamber above piston 7. Thus to secure a higher vapor pressure the cylinder 5 will be moved downwardly and to secure a lower vapor pressure said cylinder 5 will be moved upwardly.

Movement is imparted to the rod 65 by a piston 64 in a cylinder 63. Two springs 63A on opposite sides of the piston 64 hold said piston 64 and the rod 65 in a neutral or mid position when pressure is equalized on both sides of the piston 64.

The piston 64 is adapted to be moved in both directions by pressure from the auxiliary reservoir 59. This pressure is controlled by a pilot valve 60.

In said pilot valve 85 is a piston secured to a stem 86 and having two valve members 87 and 88 on opposite sides thereof. 89 is a spring that urges the piston 85 downwardly. A nut 89A is provided for adjusting the pressure of the spring 89. 90 is an exhaust passageway above the piston 85. 91 is a chamber below the piston 85 that is connected by conduit means 61 with the auxiliary reservoir 59. 92 is another chamber below the piston 85. Conduit means 62 connects the chamber 92 with the cylinder 63 below the piston 64. The valve member 88 controls the flow of vapor under pressure between the two chambers 91 and 92. Conduit 62 also communicates with a chamber 93 above the exhaust passageway 90. The valve member 87 controls the flow of vapor under pressure from chamber 93 to exhaust passageway 90. The mechanism of the pilot valve just hereinbefore described is arranged to be operated if the pressure in the reservoir 59 exceeds a predetermined maximum. Other mechanism in the upper end portion of the pilot valve 60, Fig. 2, is adapted to be operated if the pressure in the reservoir 59 drops below a predetermined minimum. Valve adjustment means is provided so that any desired spread can be obtained between the maximum and the minimum pressure at which the valve will be operated.

In the valve mechanism that responds to a minimum pressure 94 is a piston secured to a stem 95. Two valve members 96 and 97 are carried by the stem 95. A spring 98, adjustable by a nut 99, urges the stem 95 together with the piston 94 and valve members 96 and 97 upwardly, Fig. 2. 100 is an exhaust passageway below the piston 94. 101 is a chamber below said exhaust passageway 100. The valve member 97 controls the flow of vapor under pressure between chamber 101 and exhaust passageway 100. A chamber 102 is provided above the piston 94 and another chamber 103 is provided above the chamber 102. The valve member 96 controls the flow of vapor under pressure between chambers 103 and 102. An inlet passageway 104 for vapor under pressure communicates with the space above the piston 94 and with the chamber 103. The conduit 61 from the reservoir 59 communicates with the passageway 104. The chambers 101 and 102 are both connected by conduit means 62A with the upper end portion of the cylinder 63.

The operation of the pilot valve 60 is as follows: When the pressure in the reservoir 59 is between the predetermined maximum and minimum limits for which the springs 89 and 98 are adjusted then the several valve members 87, 88, 96 and 97 will be in the positions shown in Fig. 2 and both ends of the cylinder 63 will be open to exhaust. When this condition obtains the piston 64 will be in the neutral or mid position in which it is shown. If the pressure in reservoir 59 increases until it reaches the maximum limit this pressure, acting against the piston 85, will overcome the force of the spring 89 and move said piston 85 to open the valve member 88 and close the valve member 87. This closes the passageway between conduit 62 and exhaust chamber 93 and opens the passageway between conduit 62 and pressure supply conduit 61. Vapor under pressure is thus admitted to the lowermost end of the cylinder 63 to move the piston 64 upwardly. It is to be noted that when high pressure vapor is admitted to the lower end of the cylinder 63 as above described the same high pressure from conduit 61 acting against the upper piston 94 will hold the valve member 97 open thus keeping the upper end portion of the cylinder 63 open to exhaust. Movement of the piston 64 upwardly will act through the mechanism hereinbefore described to move the cylinder 5 upwardly and provide a larger compression chamber above the piston 7. This tends to reduce the pressure in the reservoir 59 and when the reservoir pressure drops below the predetermined maximum the spring 89 will close the valve 88 and open the valve 87. This leaves both ends of the cylinder 63 open to exhaust and the springs 63A will return the piston 64 to a mid position.

If the pressure in the reservoir 59 drops to or below the predetermined minimum the uppermost spring 98 will overcome the pressure against the piston 94 and will close the valve 97 and open the valve 96. This allows vapor under pressure from chamber 59 to flow through conduit 61, chamber 103, chamber 102 and conduit 62A to the upper end of cylinder 63. Pressure thus admitted to the upper end of cylinder 63 will move the piston 64 downwardly and act through the mechanism hereinbefore described to move the cylinder 5 downwardly. The downward movement of cylinder 5 will reduce the volume of the chamber above piston 7 and this will tend to increase the pressure in the reservoir.

The pressure rectifying devices just described are necessarily designed to supply ample fuel vapor at a predetermined pressure for the two cycle operation of the motor. For four cycle operation the amount of fuel vapor required for any given motor speed will be substantially one half the amount required for two cycle operation at the same speed. The required adjustments of cylinder 5 to take care of these conditions will ordinarily be taken care of by the pilot valve 60. However, to limit the upward movement of said cylinder 5 I preferably provide automatically operated deterrent means for cutting off the supply of fuel vapor to the cylinder 5 in the event said cylinder 5 is moved substantially to the uppermost limit of its movement under control of the pilot valve during four cycle operation of the motor. Parts of one means that can be used for this purpose are shown in Fig. 1 and the same is more fully illustrated in Fig. 6. This means cooperates with the pilot valve and pressure rectifying devices, as hereinafter explained, to close a butterfly valve IA in the fuel intake conduit I just before the cylinder 5 reaches its uppermost possible position. This will cause a quick drop in pressure and the pilot valve will operate and the pressure rectifying devices will immediately begin to move the cylinder 5 downwardly. Spring means is provided to continuously urge the butterfly valve IA into an open position and this spring means will normally tend to open said butterfly valve as soon as the cylinder 5 starts to move downwardly. If the motor is shifted from the four cycle to the two cycle phase at a time when the cylinder 5 is positioned near the uppermost limit of its movement and has been maintaining a chamber of large area above the piston 7 the fuel demands of the motor will be instantly increased. Under such conditions the cylinder 5 can be in substantially the position shown in Fig. 1. As soon as such a shift from four cycle to two cycle operation occurs the pressure in the reserve tank 59 and connected passageways will begin to decrease. This will operate through the pilot valve and devices connected therewith to lower the cylinder 5 thereby reducing the size of the chamber above the piston 7. If for any reason the butterfly valve IA should fail to open as the cylinder 5 moves downwardly then when said cylinder reaches a point near the lowermost limit of its movement the butterfly valve IA will be automatically opened as hereinafter explained.

Figure 6:
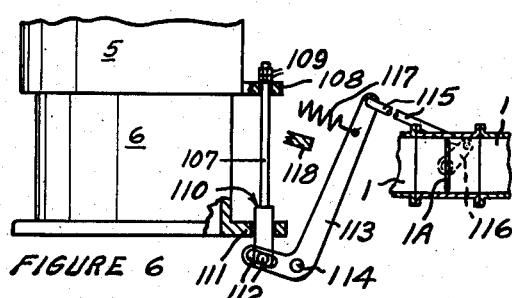
Fig. 6 is a detached fragmentary view partly in elevation and partly in section showing means connected with a movable cylinder member for controlling the position of a fuel inlet valve.

The mechanism shown in Fig. 6 for operating the butterfly valve IA comprises a rod 107 slidably disposed in a lug 108 on the cylinder 5. Bumper means 109 and 110 are provided in spaced apart relation on the rod 107 above and below the lug 108 respectively. The rod 107 is supported in guide means 111 and is connected by slot and pin means 112 with a lever 113 that is fulcrumed on a fixed pivot 114. A link 115 connects the lever 113 with a short lever 116 that is secured to the butterfly valve 1A. A spring 117 yieldingly urges the parts just described into a suitable position to hold the butterfly valve wide open. A stop member 118 limits movement in one direction of the parts by which the butterfly valve is moved.

In the operation of the devices shown in Fig. 6 when the part 108 of the cylinder 5, in its upward movement, bumps against the nuts 109 it will overcome the force of the spring 117 and begin to close the butterfly valve 1A. This closing movement of valve 1A will be rapid due to the unequal length of the arms of the lever 113. The closing movement of the valve 1A will restrict the supply of fuel vapor thus quickly lowering the pressure in the reserve tank 59. This lowering of pressure will reverse the direction of movement of the cylinder 5 and pressure equilibrium will be restored. The spring 117 will normally move the valve 1A to a wide open position as soon as the cylinder 5 begins to move downwardly after having closed or partially closed said valve 1A. If, for any reason, this spring 117 fails to thus open the valve 1A, then the lug 108 will engage with the stop means 110 just before the cylinder 5 reaches the limit of its downward movement and open said valve 1A.

Figure 7:
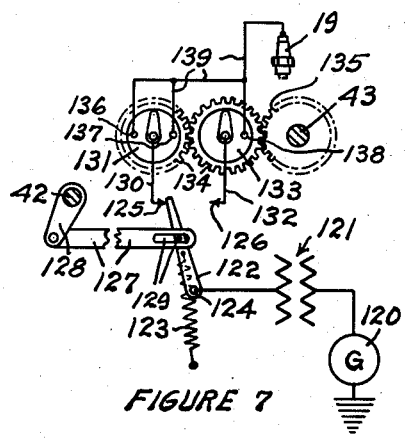
Fig. 7 is a somewhat diagrammatic view of ignition devices that can be used in connection with this invention.

Ignition devices for motors of this type will be of varied design to suit the motor. One set of ignition devices which can be used in connection with this two cylinder motor are diagrammatically shown in Fig. 7. These ignition devices comprise a generator 120 connected by way of an ignition transformer 121 with a movable switch member 122. The switch member 122 is connected with a tension spring 123 arranged so that its line of pull will pass from one side to the other of the pivotal support 124 of said switch member. This provides means for snapping the switch member 122 into engagement with either one of two contact members 125 or 126. The switch member 122 is adapted to be moved away from the contact member 125 or 126 with which it is in contact by a link 127 that is connected by slot and pin means 129 with the switch member 122 and by a lever arm 128 with the control shaft 42. Thus movement of the control shaft 42 from one phase position to the other will make the proper change in ignition for two cycle or four cycle operation. The contact member 125 is connected by a conductor 130 with a rotating contact arm of a distributor 131. The contact member 126 is connected by a conductor 132 with a rotating contact arm of a four cycle distributor 133. The two rotating contact arms are interconnected for rotation at the same speed as by two gearwheels 134 and are driven at the same speed as the four cycle cam shaft 43 by means such as a third gearwheel 135 which is connected with said four cycle cam shaft 43. The two cycle distributor 131 has two contact members 136 and 137 spaced one hundred eighty degrees apart and positioned in the path of the rotating contact arm. The four cycle distributor 133 has one contact member 138. All of the contact members 136, 137 and 138 are connected by conductor means 139 with the spark plug 19 that controls the firing in both of the power cylinders 13 and 16.

The four cycle cam shaft 43 makes one complete revolution for each two revolutions of the crank shaft 24. Obviously when a circuit is completed through the four cycle distributor 133 one properly timed spark will be delivered by the spark plug 19 for each two revolutions of the crank shaft 24 and when a circuit is completed through the two cycle distributor 131 one properly timed spark will be delivered to the spark plug 19 for each revolution of the crank shaft 24.

The two cycle method of operation of the engine is as follows: As the pump piston 7, shown at the top of its stroke in Fig. 1, moves down a charge of vaporized fuel will be drawn into the cylinder 5 by way of inlet conduit 1, conduit 3 and valve 4. When the piston 7 next moves upward this charge of fuel vapor will be forced past the spring loaded check valve 8 and into the conduit 9 from which some of this charge is free to enter the auxiliary reservoir 59. From the conduit 9 the major portion of the fuel expelled by each stroke of the piston 7 passes through the conduit 10 into the power intake piston 11, Fig. 2. When the engine is operating in the two cycle phase the valves 12 and 17 will both be closed while the piston 7 is moving upwardly and a charge of burning gas will be expanding in the cylinders 13 and 16. At about the time the piston 7 and cylinders 13 and 16 reach the upper most limit of their movement in their power stroke the exhaust valve 17 opens and the burned gases from cylinders 13 and 16 and passageway 19A exhaust through the piston 15 and conduits 18, Fig. 1, connected therewith. Next in sequence after the opening of the exhaust valve 17 and during the final stages of the upward stroke of the cylinders 13 and 16, the inlet valve 12 opens and admits a fresh charge of fuel, the exhaust valve 17 closes and cuts off exhaust before the fresh fuel begins to escape, the inlet valve 12 closes and the cylinders 16 continue to move downwardly to complete compression of the charge, which is ignited at the proper instant and the cycle repeated.

From the above description it will be seen that the incoming fuel vapors pass up through piston 11, past valve 12, through cylinder 13, passageway 19A and cylinder 16 to sweep out the burned gases and efficiently scavenge both of the cylinders at the end of each power stroke. The closing of exhaust valve 17 at the proper time cuts off the escape of fuel vapor and the closing of the inlet valve 12 immediately after the closing of the exhaust valve 17 allows for compression of the fuel vapor before the fuel is ignited by the spark plug 19. Ignition occurs preferably just before the cylinders 13 and 16 reach the end of their downward stroke and the expanding fuel does its work during the first portion of the succeeding upward stroke of the cylinders 13 and 16.

When this engine is to be operated on a four stroke cycle the lever 25 is moved to a four cycle position. This brings about the following adjustments: The timing of the spark is changed so that ignition will occur at or near the end of every other down stroke of the cylinders 13 and 17. The tappet carriage 28 is moved to the left from the position in which it is shown in Fig. 1, thus moving the two tappets 30 into engagement with the cam shaft 43 and moving the two tappets 31 out of engagement with the cam shaft 38.

In four cycle operation when the cylinders 13 and 16 are at the upper limit of a power stroke following an explosion of fuel therein the intake valve 12 will be closed and the exhaust valve 17 will be open. As these cylinders move downwardly on the exhaust stroke the burned gases are exhausted through piston 15 and conduit 18. As these cylinders start to move upwardly on the intake stroke the inlet valve 12 opens and the exhaust valve 17 closes and fuel vapor is drawn in during said intake stroke. At about the time the cylinders 13 and 16 reach the upper limit of their intake stroke the intake valve closes. These cylinders 13 and 16 then move downwardly on the compression stroke with both valves 12 and 17 closed. At about the time said cylinders reach the lower limit of their compression stroke ignition occurs and said cylinders are driven upwardly on their power stroke. At the end of the power stroke the exhaust valve 17 is again opened and the four stroke sequence is repeated.

For operation as a diesel or direct fuel injection engine the same sequences as above described are used for both two-stroke and four-stroke cycle operation and regular or special diesel accessories are incorporated in lieu of a carburetor and other mechanical arrangements made to suit the occasion.

The reservoir 59 is provided in communication with the fuel vapor conduit 9 to act as a compression chamber and to absorb pulsations in the fuel vapor that is being compressed by reciprocation of the piston 7.

The automatic devices hereinbefore described are provided for controlling the pressure in the reservoir 59 to keep this pressure always within certain predetermined limits.

The foregoing description and accompanying drawings clearly disclose a preferred embodiment of this invention but it will be understood that this disclosure is merely illustrative and that changes may be made within the scope and spirit of the following claims.

I claim:

1. An internal combustion engine comprising a cylinder and a piston reciprocable relative to each other; valve means selectively adjustable for two cycle or four cycle power generating operation of said engine; a storage tank for compressed fuel gas; conduit means connecting said storage tank with said valve means supplying fuel from the storage tank to the engine at different rates of consumption as required by both two cycle and four cycle operation of the engine; and pressure rectifying fuel compression means connected with said engine and operated thereby and supplying fuel to the pressure tank at a predetermined sustained pressure for both cycles of operation of the engine.

2. An internal combustion engine comprising a cylinder and a piston reciprocable relative to each other; inlet and exhaust valve means controlling the inlet of fuel to and the exhaust of gases from said cylinder; transposing valve gear means operable to selectively actuate said valve means for power generating two cycle and four cycle operation of the engine; a storage tank for compressed fuel gas; conduit means connecting said storage tank with said valve means supplying fuel from the storage tank to the engine at different rates of consumption as required by both two cycle and four cycle operation of the engine; fuel compressor means operated by said engine and connected with said storage tank adapted to compress fuel in said tank; and control means responsive to variations in the pressure of the compressed fuel and controlling the pressure of said compressed fuel, whereby a predetermined sustained pressure of fuel is maintained in the storage tank for both cycles of operation of the engine.

3. The apparatus as set forth in claim 2 in which the compressor means comprises a piston reciprocable in cylinder means that is formed of two relatively telescopic parts and the compensating means comprises devices for longitudinally adjusting the two parts of said cylinder means relative to each other to thereby vary the area of the portion of said cylinder means in which the compression of the fuel takes place.

4. An internal combustion engine comprising cylinders and pistons reciprocable relative to each other; inlet and exhaust valve means controlling the inlet of fuel to and the exhaust of gases from said cylinders; transposing valve gear means operable to selectively actuate said valve means for two cycle and four cycle operation of the engine; a storage tank for compressed fuel gas; conduit means connecting said storage tank with said valve means supplying fuel from the storage tank to the engine at different rates of consumption as required by both two cycle and four cycle operation of the engine; variable displacement adjustable fuel compressor means operated by said engine adapted to compress fuel in said storage tank for said engine; compensating means controlled by variations in the pressure of the compressed fuel in said storage tank for adjusting said variable displacement compressor means to maintain said pressure of said compressed fuel between predetermined pressure limits, whereby a predetermined sustained pressure of fuel is maintained in the storage tank for both cycles of operation of the engine; and emergency valve means controlling the inlet of fuel to said fuel compressor means, said emergency valve means being operable to limit the adjustment of said compressor means.

5. An internal combustion engine comprising two parallel spaced apart fixed pistons; two movable cylinders fitting over and reciprocable on said pistons; a common cylinder head rigidly connecting said two movable cylinders and having a chamber communicatively connecting said two cylinders; fuel inlet and exhaust gas conduits provided longitudinally of said pistons; valves controlling said fuel inlet and exhaust gas conduits; transposing valve gear means operable to selectively actuate said valves for two cycle or four cycle operation; a fuel compressor cylinder positioned above said engine cylinders; piston rod means carried by said engine cylinders and extending in two directions therefrom; a piston in said compressor cylinder secured to said piston rod means; conduit means connecting said fuel compressor cylinder with said pistons, whereby fuel compressed in said compressor cylinder can be delivered to the engine cylinders; a crank shaft below said engine cylinders and pistons; connecting rod means connecting said cylinder head with said crank shaft; and universally jointed cross head means connecting said connecting rod means with said piston rod means.

6. In an internal combustion engine, two fixed pistons each having a longitudinal passageway therein; two cylinders reciprocable over the respective pistons with one end portion of each piston positioned outside of its cylinder; an intake conduit communicatively connected with the passagway in one of said pistons; an exhaust conduit communicatively connected with the passageway in the other piston; a valve carried by each piston and positioned at the end of the piston which is disposed within a cylinder and cooperating with the piston to control the flow of gas through the longitudinal passageway in the piston; a valve stem attached to each valve and extending outwardly through the piston; a crank shaft connected with said cylinders and driven thereby; a two cycle cam shaft having a cam thereon; means continuously driving said two cycle cam shaft at the same speed as the crank shaft; a four cycle cam shaft having a cam thereon; means continuously driving said four cycle cam shaft at one half the rotary speed of the crank shaft; tappet carriage means movable relative to the two valve stems and the two crank shafts; tappet carriage moving means connected with said tappet carriage means; and two pairs of valve tappets carried by the tappet carriage means and positioned adjacent said two valve stems and said two cam shafts and movable with the tappet carriage means so that when one tappet of each pair is positioned for operative engagement with a valve stem and one cam shaft, the other tappet of the pair will be disengaged as respects the same valve stem and the other valve shaft, whereby control of the valves of said engine may be selectively transposed back and forth from one cam shaft to the other smoothly and with the engine operating at a normal speed.

ZOROASTER G. PARSONS.

REFERENCES CITED

The following references are of record in the file of this patent:

UNITED STATES PATENTS

| Number | Name | Date |
|---|---|---|
| 561,374 | Chamberlin | June 2, 1896 |
| 962,437 | Kilgore | June 28, 1910 |
| 991,063 | Hopewell | May 2, 1911 |
| 1,044,096 | Sorg | Nov. 12, 1912 |
| 1,134,684 | Kramer | Apr. 6, 1915 |
| 1,208,933 | Edwards | Dec. 19, 1916 |
| 1,225,401 | Blanchard | May 8, 1917 |
| 1,313,634 | Jayne | Aug. 19, 1919 |
| 1,399,900 | Spado | Dec. 13, 1921 |
| 1,436,976 | Sherbondy | Nov. 28, 1922 |
| 1,517,372 | Martineau | Dec. 2, 1924 |
| 1,687,547 | DeBaun | Oct. 16, 1928 |
| 1,691,319 | Watkins | Nov. 13, 1928 |
| 1,708,283 | Skinner | Apr. 9, 1929 |
| 1,743,908 | Anderson | Jan. 14, 1930 |
| 1,812,862 | Clarke | July 7, 1931 |
| 1,871,820 | Morton | Aug. 16, 1932 |
| 2,033,350 | Murphy | Mar. 10, 1936 |
| 2,178,152 | Walker | Oct. 31, 1937 |

FOREIGN PATENTS

| Number | Country | Date |
|---|---|---|
| 13,747 | Great Britain | June 11, 1909 |
| 211,995 | Great Britain | Mar. 6, 1924 |
| 256,648 | Great Britain | Sept. 29, 1927 |
| 522,098 | Germany | Mar. 30, 1931 |